United States Patent
Shaw et al.

(10) Patent No.: US 8,948,049 B2
(45) Date of Patent: Feb. 3, 2015

(54) METHOD AND SYSTEMS FOR DETERMINING PATH OF A VIRTUAL CONNECTION THROUGH A NETWORK

(75) Inventors: James Mark Shaw, Cary, NC (US); Raghavendra B. Uppalli, Cary, NC (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 13/454,034

(22) Filed: Apr. 23, 2012

(65) Prior Publication Data
US 2012/0207058 A1    Aug. 16, 2012

Related U.S. Application Data

(63) Continuation of application No. 12/192,103, filed on Aug. 14, 2008, now Pat. No. 8,165,038, which is a continuation-in-part of application No. 11/506,648, filed on Aug. 18, 2006, now Pat. No. 7,894,369.

(60) Provisional application No. 60/968,021, filed on Aug. 24, 2007, provisional application No. 60/709,769, filed on Aug. 19, 2005.

(51) Int. Cl.
| | |
|---|---|
| *H04L 12/28* | (2006.01) |
| *H04L 12/46* | (2006.01) |
| *H04L 12/715* | (2013.01) |
| *H04L 12/751* | (2013.01) |

(52) U.S. Cl.
CPC ............ *H04L 12/4633* (2013.01); *H04L 45/04* (2013.01); *H04L 45/10* (2013.01)
USPC ........................................................ 370/254

(58) Field of Classification Search
None
See application file for complete search history.

(56) References Cited

U.S. PATENT DOCUMENTS

| | | | |
|---|---|---|---|
| 6,173,399 B1 | 1/2001 | Gilbrech | |
| 6,405,248 B1 | 6/2002 | Wood | |
| 6,717,944 B1 | 4/2004 | Bryden et al. | |
| 7,039,058 B2 * | 5/2006 | Carvey | 370/400 |
| 7,411,965 B2 | 8/2008 | Chu et al. | |
| 7,430,205 B2 * | 9/2008 | Ota et al. | 370/393 |
| 7,489,681 B1 * | 2/2009 | Aggarwal et al. | 370/389 |
| 7,529,243 B2 | 5/2009 | Sodder et al. | |
| 7,584,298 B2 * | 9/2009 | Klinker et al. | 709/238 |
| 8,098,665 B2 * | 1/2012 | Hu | 370/395.3 |
| 2004/0037260 A1 | 2/2004 | Kakemizu et al. | |
| 2004/0042402 A1 | 3/2004 | Galand et al. | |
| 2005/0022189 A1 | 1/2005 | Proulx et al. | |
| 2005/0030904 A1 | 2/2005 | Oom Temudo de Castro et al. | |
| 2006/0059370 A1 | 3/2006 | Asnis et al. | |
| 2006/0182034 A1 | 8/2006 | Klinker et al. | |

* cited by examiner

*Primary Examiner* — Rhonda Murphy
(74) *Attorney, Agent, or Firm* — Park, Vaughan, Fleming & Dowler LLP

(57) ABSTRACT

Networks and devices may communicate with each other using virtual connections. In one embodiment, a computer-implemented model is generated and includes a representation of the path of a virtual connection. The path of a virtual connection, such as an IP tunnel, is traced between its source and destination. The physical connection corresponding to such IP tunnels are found by tracing through the device configuration and routing tables at routers in the network. The path between the source and destination devices is traced until the path is terminated at the destination device, or at an interface to an external network. If the path ends at an external network, the path is traced from the destination device toward the source device until a corresponding interface to the external network is reached.

20 Claims, 5 Drawing Sheets

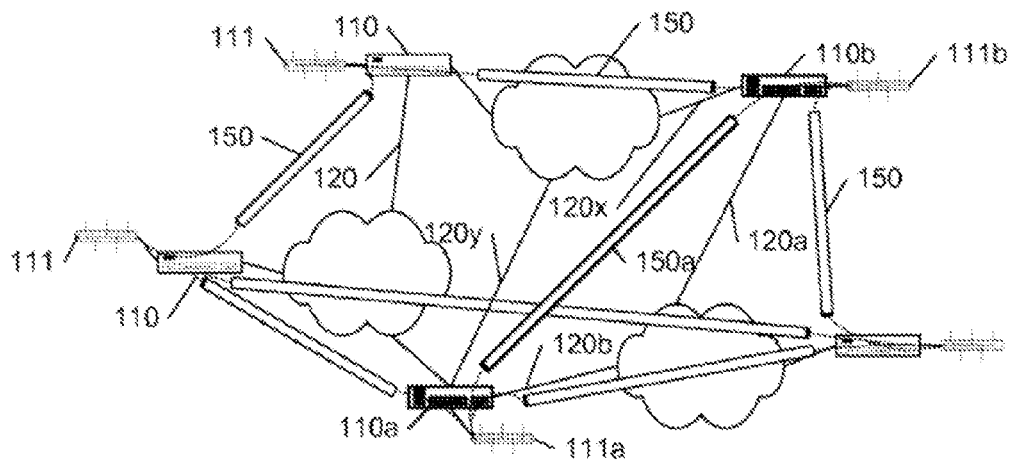
FIG. 1
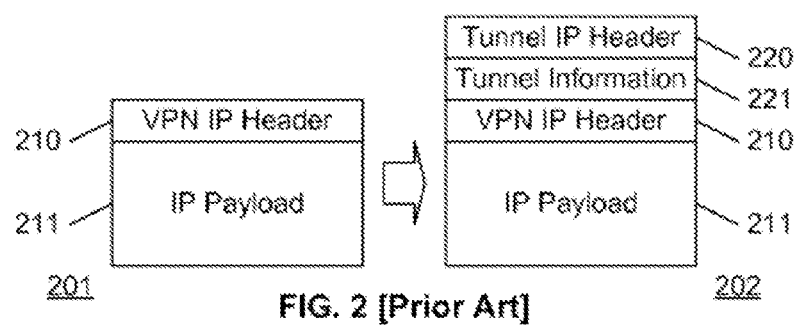
FIG. 2 [Prior Art]
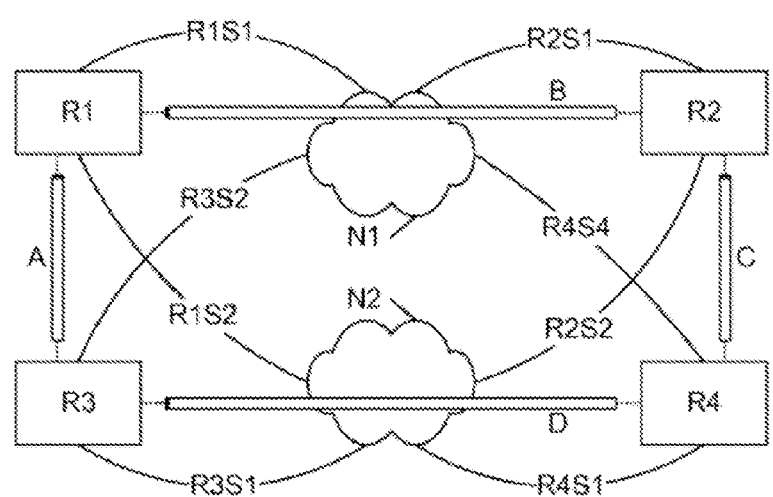
FIG. 3

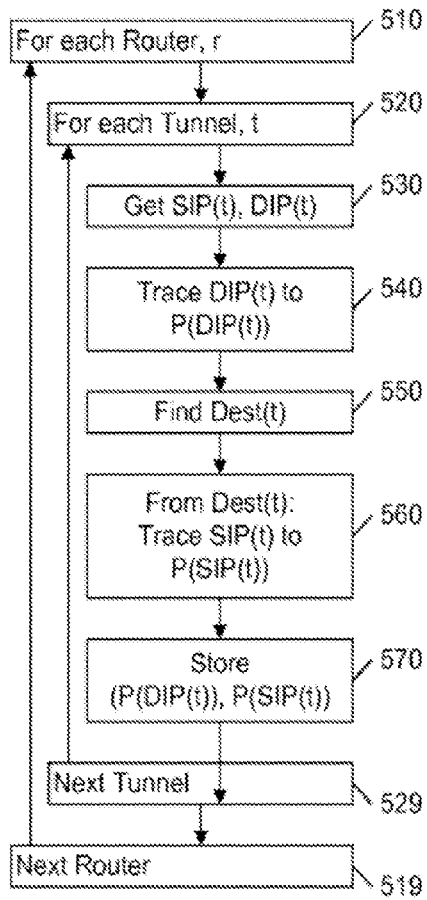
FIG. 5A
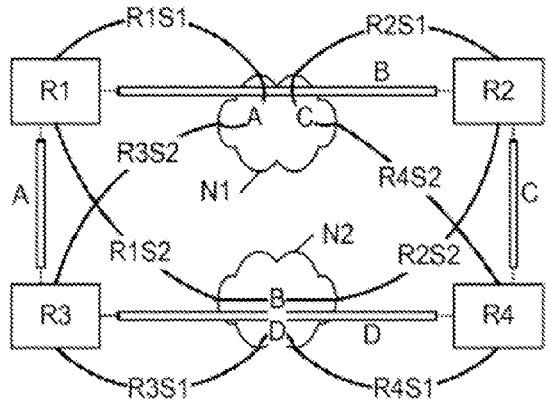
FIG. 5C
| Tunnel | SIP | DIP | P(DIP) | Dest | P(SIP) |
|---|---|---|---|---|---|
| T1 on R1 | 11.1.1.1 | 11.3.1.2 | R1S1 | R3 | R3S2 |
| T2 on R1 | 11.1.1.2 | 11.2.1.2 | R1S2 | R2 | R2S2 |
| T1 on R2 | 11.2.1.1 | 11.4.1.1 | R2S1 | R4 | R4S2 |
| T2 on R2 | 11.2.1.2 | 11.1.1.2 | R2S2 | R1 | R1S2 |
| T1 on R3 | 11.3.1.1 | 11.4.1.2 | R3S1 | R4 | R4S1 |
| T2 on R3 | 11.3.1.2 | 11.1.1.1 | R3S2 | R1 | R1S1 |
| T1 on R4 | 11.4.1.1 | 11.2.1.1 | R4S2 | R2 | R2S1 |
| T2 on R4 | 11.4.1.2 | 11.3.1.1 | R4S1 | R3 | R3S1 |
FIG. 5B

METHOD AND SYSTEMS FOR DETERMINING PATH OF A VIRTUAL CONNECTION THROUGH A NETWORK

CROSS REFERENCE TO RELATED APPLICATIONS

This application is a continuation of U.S. patent application Ser. No. 12/192,103, entitled "NETWORK PHYSICAL CONNECTION INFERENCE FOR IP TUNNELS," filed Aug. 14, 2008, which is a continuation-in-part of U.S. patent application Ser. No. 11/506,648, Aug. 18, 2006, which claims the benefit of U.S. Provisional Patent Application 60/709,769, filed Aug. 19, 2005 and also claims the benefit of U.S. Provisional Patent Application 60/968,021, filed 24 Aug. 2007, all of which are herein incorporated by reference in their entirety.

FIELD

This invention relates to the field of network analysis, and in particular to network modeling.

BACKGROUND AND SUMMARY

The management of a complex network requires the use of tools that facilitate the analysis and diagnosis of network performance, and tools have been developed to ease this task. Many of the tools that have been developed for such analysis and diagnosis employ models of the networks to emulate/simulate the actual operations that occur within the network, or to predict performance parameters related to the expected performance of the network under a variety of conditions.

In order to effectively model the performance of a network, it is often necessary to model the physical topology of the network. For example, propagation delays are dependent on the geographic length of the communication paths, communications within local subnetworks avoid the access delays associated with wide-area networks, and so on.

In many cases, the 'logical' or 'virtual' connections that are created within a network obscure the physical topology of the network, and often the virtual structure of the network has little or no correspondence to the physical network. FIG. 1 illustrates an example network with routers 110 that provide connectivity between nodes on a local network 111 to remote nodes on other local networks 111. For ease of reference, the term router is used herein to identify any element of a network that is configured to affect or control the path that a packet takes as it is propagated from a source to a destination. That is, for example, a router includes any switching element that selects a path for the a packet, as well as any element that modifies a packet to affect the path that such a switching element may select, or any element that modifies the switching element based on packet content, and so on, wherein these elements may include hardware, software, firmware, or combinations thereof.

Physical connections 120 provide connectivity between the routers 110, and virtual connections 150 allow nodes on different physical networks 111 to appear to be members of the same subnetwork. In the example of FIG. 1, local networks 111a and 111b are connected via a virtual connection 150a. This virtual connection 150a conceals the fact that these networks 111a and 111b may be distant from each other, and conceals the actual physical path upon which messages will travel between networks 111a and 111b. From the network diagram of FIG. 1, it cannot be determined, for example, whether such messages will travel the path 120a-120b, or the path 120x-120y.

In the Internet Protocol (IP) arena, IP tunnels are used to create virtual connections, to create Virtual Private Networks (VPN). FIG. 2 illustrates how messages that are addressed to remote nodes on a VPN are processed to effect the virtual connection. The IP packet 201 includes a data payload 211 and header information 210 that includes the destination address for the packet. In this example, the header information 210 would include the address of the destination within the virtual network. Commonly, this address is an IP private address (defined in the IP specification as addresses within particular ranges, such as addresses beginning with "10", or "192.168") that routers will recognize as being local, and are not to be routed beyond the local network.

Using IP tunneling, a router is configured to recognize an address as corresponding to a defined tunnel. Packets that are addressed to a tunneled VPN address 210 are encapsulated within an IP packet 202 by adding a second IP header 220 before the original header 210 in the VPN-addressed packet. The added tunnel IP header 220 includes the tunnel endpoint addresses, and the packet 202 may also include other tunnel information 221. When the packet 202 reaches the tunnel endpoint, the tunnel's IP header 220 and any additional tunnel information 221 is stripped off, producing a copy of the original VPN packet 201 with the original VPN address 210. This copy of the packet 201 is thereafter propagated at the local network at the tunnel endpoint in the same manner as it would have been propagated had it originated in the local network at the tunnel endpoint.

A common difficulty in network modeling is the modeling of IP tunnels, because the virtual private network is specifically provided to appear to be a local network, and the physical topology is masked. For a typical IP tunnel, the tunnel physical source and/or destination network interface may not be explicitly stated in the device configuration, and the tunnel configuration may lack source interface information, or refer to a logical source or destination loopback interface.

Commonly, IP tunnels are used to provide a virtual path through a public network. In such a case, the actual physical path within the public network is unknown, and is generally modeled as a 'black box' or 'cloud', with physical input/output interfaces, but lacking details regarding the internals of the cloud. Although the physical model of the internals of such clouds is unavailable, the modeling of the network of interest, external to the clouds, often requires or benefits from knowing how the network is coupled to the clouds, including how each tunnel is physically coupled to each cloud.

It would be advantageous to provide a method and system that determines the actual physical source and destination interfaces used to carry tunnel data. It would also be advantageous to provide a method and system to determine the physical path between the tunnel endpoints.

These advantages, and others, are gained by tracing through the device configuration and routing tables at the routers in a network to determine the outbound interface associated with each tunnel endpoint, and then inferring a likely return interface associated with the opposite tunnel endpoint. Having determined the physical devices and interfaces at the source and destination of each tunnel, the physical path between these source and destination devices is traced from the source toward the destination until the path is terminated at the destination device, or at an interface to an external network. If the path ends at an external network, the path is traced from the destination device toward the source device until a corresponding interface to the external network is reached.

BRIEF DESCRIPTION OF THE DRAWINGS

The invention is explained in further detail, and by way of example, with reference to the accompanying drawings wherein:

FIG. 1 illustrates an example network diagram that contains physical and virtual connections;

FIG. 2 illustrates conventional encapsulation to effect IP tunneling;

FIG. 3 illustrates an example network of four routers with physical and virtual connections;

FIG. 5A illustrates an example flow-diagram for determining the physical interfaces on source and destination devices of tunnels in a, and FIGS. 5B-5C illustrate the operation of this flow-diagram as applied to the example four-router network of FIG. 3 and FIGS. 4A-D;

Throughout the drawings, the same reference numerals indicate similar or corresponding features or functions. The drawings are included for illustrative purposes and are not intended to limit the scope of the invention.

DETAILED DESCRIPTION

Figure 4A:
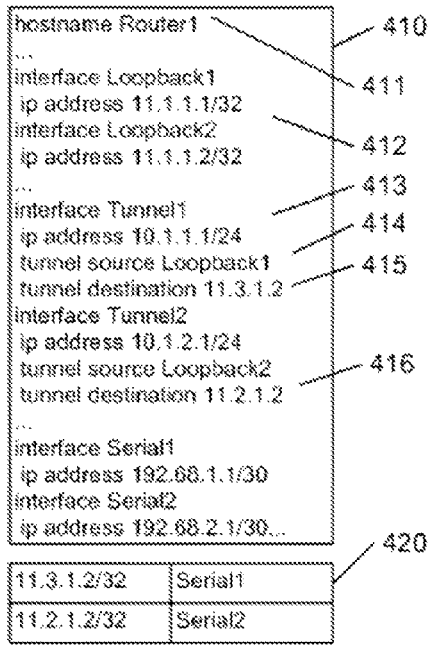
FIGS. 4A-4D illustrate example configuration data and routing table data corresponding to the four routers in FIG. 3.
Figure 4B:
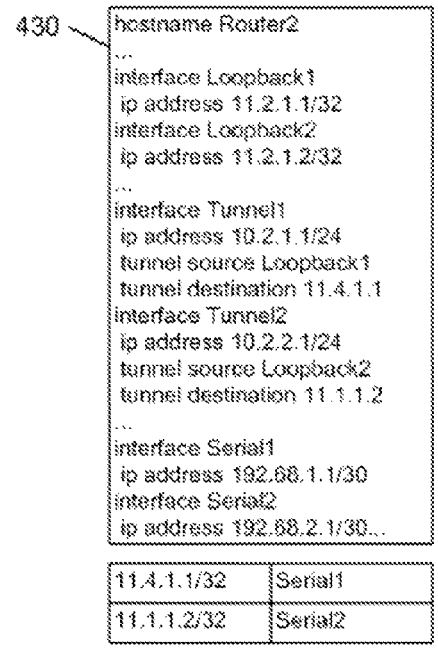
Figure 4C:
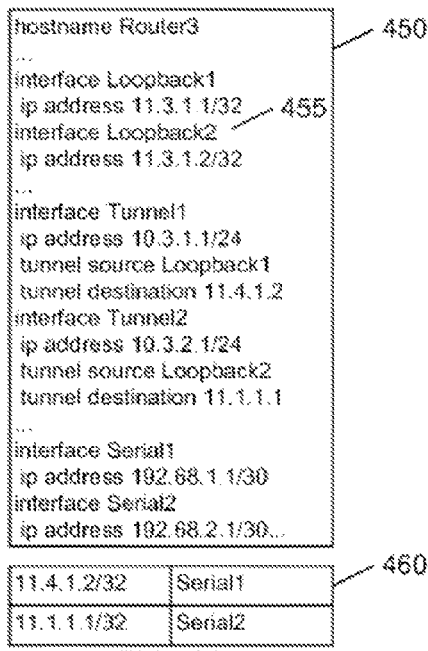
Figure 4D:
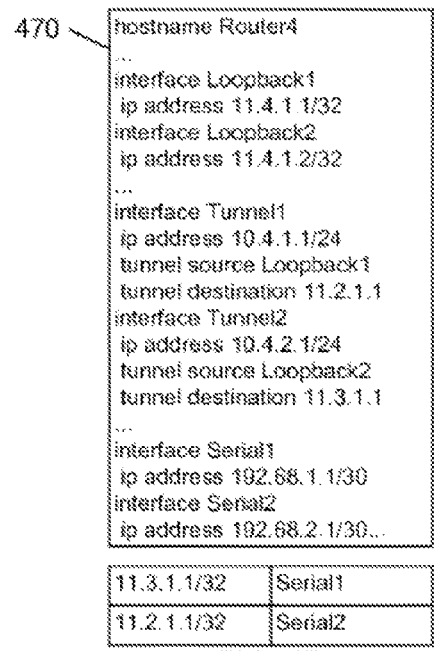

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Also for the purposes of explanation rather than limitation, the invention is presented herein using the paradigm of an IP-Tunnel being used to provide a logical/virtual connection between devices. One of skill in the art will recognize that the principles presented herein are also applicable to other virtual connections, such as Frame-Relay and ATM Virtual Circuits (VCs), MPLS Label Switch Paths (LSPs), and the like.

FIG. 3 illustrates an example network of four routers R1-R4 with physical R1S1-R4S4 and virtual A-D connections among these routers. In this example, each router R1-R4 has two physical connections, or interfaces, to external networks N1, N2. The routers are named "Router1", "Router2", etc., and the physical connections at each router are named "Serial1 and Serial2", and thus in FIG. 3, these serial connections are identified as R1S1 (Router1, Serial1), R1S2 (Router1, Serial2), R2S1, R2S2, and so on. In this example, assuming that the tunnel is embodied as a single bi-directional channel between the routers, each tunnel A, B, C, D may be embodied as two possible physical paths. Tunnel A, between R1 and R3, for example, may be embodied via connections R1S2 (R1-N2) and R3S1 (N2-R3), or via connections R1S1 (R1-N1) and R3S2 (N1-R3).

To create an IP tunnel between two network devices, the tunnel must be defined at a source end point of the tunnel. At a minimum, the destination end point of the tunnel must be specified, or, if the tunnel is dynamic, determinable at some point. IP tunnels are often configured in pairs, to provide a bi-directional tunnel. Because the bi-directional tunnel is defined to provide routing out from each end, each end considers itself the 'source' end, and the 'other end' is the 'destination' end. Thus, at a minimum, the destination end of the tunnel from each source end must be defined or determinable. This tunnel destination is defined as an IP address residing on an interface of the destination device. Optionally, the local tunnel source may be specified as either an IP address or interface name. Because the source and destination interfaces referenced may be logical loopback interfaces, the physical interfaces associated with the tunnel are not immediately apparent. FIGS. 4A-4D illustrate example configuration data 410, 430, 450, 470 corresponding to the four routers R1, R2, R3, R4 in FIG. 3, respectively. Using router Rts data 410 as an example, the hostname entry 411 identifies the name of the device, and the interface entries 412 associate interface names to an IP addresses. At 413, a tunnel name 'Tunnel1' is defined, and associated to IP address 10.1.1.1/24. In this manner, packets that are destined for this address are tunnel encapsulated, as described with reference to FIG. 2, and transmitted to the tunnel destination, defined at 415 as IP address 11.3.1.2. In similar manner, Tunnel2 corresponds to IP address 10.1.2.1/24; its tunnel source address is Loopback2 (IP: 11.1.1.2, at 412), and its destination address 416 is 11.2.1.2.

Block 420 illustrates an extract of information from the routing table of Router1. As is known in the art, a routing table indicates a 'next hop' for routing a packet, based on the destination address of the packet. Alternatively, the routing of specific addresses to specific next hop may be included in the configuration data 410, if the routing is static. In this example, packets addressed to IP address 11.3.1.2 are routed to "Serial1", which in this example defines the aforementioned physical connection R1S1 to the net N1 of FIG. 3.

Thus, in accordance with one aspect of this invention, by tracing the tunnel information from the configuration data 410 and the routing table 420, it can be determined that packets that are routed to private address 10.1.1.1 will be encapsulated into packets addressed to the tunnel destination 11.3.1.2, which will be routed to physical interface Serial1 (R1S1 of FIG. 3). This defines the physical connection corresponding to Tunnel1's destination, but does not, per se, define the topology of the tunnel, because it only defines the physical connection to N1, and does not define the path beyond N1. That is, at this point, it has not yet been determined that the Tunnel1's end is at Router3.

Because the destination address is globally unique, the identity of the device corresponding to the tunnel destination 11.3.1.2 can be found from the network configuration data, using any of a variety of techniques common in the art. For example, most network analysis tools are configured to identify the global IP addresses that are local to each router in the modeled network, and a simple search of these addresses will identify that, in this example, Router3 includes IP address 11.3.1.2 as a local address. In this example, a search of Router3's sample configuration data indicates that IP address 11.3.1.2 is associated with Router3's Loopback2 interface, at 455. Thus, in accordance with another aspect of this invention, by processing the network configuration data, it is determined that the destination of Tunnel1 at Router1 is at Router3; however, at this point, the physical interface to Router3 for this tunnel has not yet been determined.

Because the interfaces at which inbound packets arrive are not explicitly defined, per se, the physical interface for packets from Tunnel1 at Router1 to Router3 cannot be absolutely determined. However, in accordance with another aspect of this invention, because most interfaces are symmetric, the above process is repeated in the reverse direction, from Router3 to Router1. At a symmetric interface, the same interface is used for incoming as well as outgoing packets from and to a given IP address. As such, the physical interface for packets from the tunnel to Router3 can be inferred from the physical interface defined for packets from the tunnel's determined destination, Router3, to the tunnel's source IP address, at Router1.

In this example, Tunnel1's source IP address at Router1 is defined as Loopback1 414. Subsequent tracing for Loopback1 indicates that it has an IP address of 11.1.1.1/32, at 412. A search of Router3's routing table 460 indicates that this IP address 11.1.1.1/32 is routed to physical interface Serial2 on Router3. That is, packets from the Tunnel1's destination, Router3, to its source IP address on Router1 will be routed to physical interface Serial2 on Router3. Assuming a symmetric interface, it is thus inferred that packets from Tunnel1 on Router1 to Router3 will arrive at physical interface Serial2 on Router3.

As illustrated by this example, by tracing the configuration data and routing tables at a source end of a tunnel, the global destination IP address and the physical interface for packets addressed to this IP address are determined; and, by tracing the configuration data and routing tables at the determined global destination IP address, the physical interface for packets arriving at this IP address can be inferred.

FIG. 5A illustrates a flow diagram for a process to determine the physical interfaces used at the source and destination of tunnels in a network. FIGS. 5B-5C illustrate the application of the flow diagram of FIG. 5A to the network illustrated in FIG. 3, configured as indicated in FIGS. 4A-4D.

The loop 510-519 processes the configuration and routing information at each router in the network. The loop 520-529 processes each tunnel defined in the configuration. For each defined tunnel end at each router, the tunnel source and destination IP addresses (SIP and DIP) are determined 530 from the tunnel definition in the configuration data at the source router. This may require tracing through the configuration data, if symbolic names are used, such as the use of "loopback1" and "loopback2" in FIGS. 4A-4D.

At 540, the physical interface P(DIP) associated with the destination IP address is determined from the routing table, if available, or, if the route is static, from the configuration data. As illustrated in FIG. 5B, at 591, using the configuration 410 and routing 420 information at Router1 (FIG. 4A), the source IP (SIP) of Tunnel1 on Router1 (T1 on R1) is 11.1.1.1, the destination IP (DIP) is 11.3.1.2, and the physical interface P(DIP) assigned to this destination IP (from 420 in FIG. 4A) is Serial1 on Router1, which is illustrated in FIGS. 3 and 5B-5C as R1S1. In this example, the routing table indicates the physical interface directly; alternatively, as discussed above, the physical interface may be determined by the recursive tracking through the routing tables of each identified next-hop router until a physical interface is found, or the destination IP is found as the next-hop.

At 550, the destination router corresponding to the destination IP is determined, by identifying the router having this address as a local address, as discussed above. At 560, the routing table of the destination router is assessed to determine the physical interface P(SIP) that is used for sending packets from the destination router to the source IP address of the tunnel (SIP). In the example at 551 of FIG. 5B, the destination router (Dest) corresponding to the destination IP address (DIP) 11.3.1.2 is Router3 (R3), and the routing table 460 of Router3 (FIG. 4C) indicates that the Source IP (SIP) 11.1.1.1 is associated with physical interface Serial2 on Router3 (R3S2 in FIGS. 3 and 5B-5C). Assuming that this interface is symmetric, it can be inferred that Router3 receives packets from the tunnel via this interface.

At 560, the determined and inferred physical interfaces, P(DIP) and P(SIP), respectively, corresponding to the tunnel are stored.

The above process is repeated for each tunnel being mapped. In this manner, as illustrated in the second row of FIG. 5B, the processing of the configuration and routing information corresponding to Tunnel2 at Router1 in FIG. 4A indicates T2 at R1 has a tunnel source IP address of 11.1.1.2, destination IP address of 11.2.1.2, and a corresponding physical connection to this destination IP address of R1S2. This destination IP address corresponds to a local address of Router2, and, by tracing the tunnel's source IP address 11.1.1.2 from Router2's routing table, it can be inferred that Router2 receives packets from this tunnel on its Serial2 interface, R2S2. The remaining rows of information in FIG. 5B correspond to the tunnel information captured from the configuration and routing information of FIGS. 4B-4D, corresponding to routers R2-R4 in FIG. 3.

In the example of FIGS. 3, 4B-D, 5B-C, the tunnels are configured in pairs, as is common in most typical network configurations. The identification of tunnel pairs can be used to simplify the process illustrated in FIG. 5A. For example, at 530, the source and destination IP addresses are determined for the current tunnel. If a prior processed tunnel has the same pair of IP addresses, but arranged as destination and source IP addresses, i.e. complementary source and destination IP addresses, then these tunnels form a complementary pair, and the subsequent processes 540-560 can be skipped for this new tunnel. That is, for example, as Tunnel2 on Router3 (row 596 in FIG. 5B) is being processed, when it is detected that Router3's SIP and DIP correspond to Router1's DIP and SIP, respectively, the remaining fields on row 596 can be filled in directly from the (complementary) information at row 591.

FIG. 5C illustrates the network diagram of FIG. 3, augmented to include the physical connections corresponding to each of the tunnel pairs A-D. That is, tunnel-pair A, between R1 and R3, includes physical connections R1S1 (R1-N1) and R3S2 (N1-R3); tunnel-pair B, between R1 and R2, includes physical connections R1S2 (R1-N2) and R2S2 (N2-R2); and so on.

In accordance with another aspect of this invention, having determined the physical interfaces at the source and destination of each tunnel, the physical path between these source and destination interfaces is determined. That is, in the example of FIGS. 3 and 5C, each of the routers is illustrated as being directly connected to the external networks N1 and N2. Such routers are termed 'edge routers' because they are at the boundary between two networks, the internal network that the router supports, and the external network, and as such, the physical topology is defined by the physical interfaces to the external network. For non-edge router devices, however, other devices may be identifiable along the path between the source and destination interfaces.

Figure 6A:
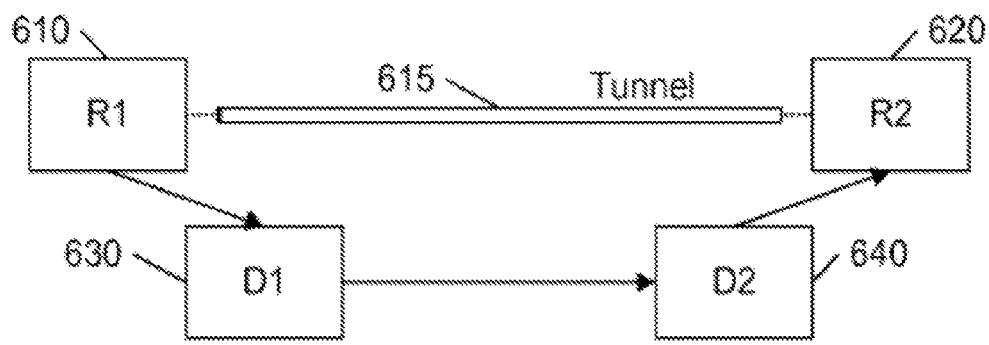
FIGS. 6A-6B illustrate example physical topologies corresponding to a defined tunnel.
Figure 6B:
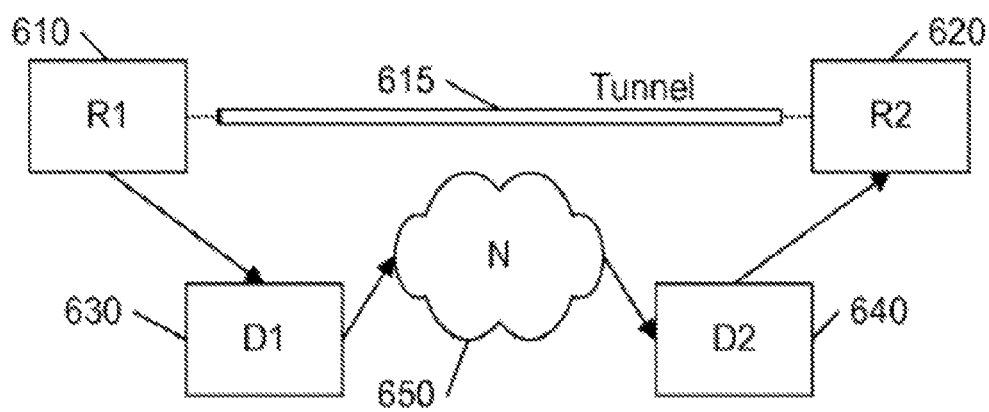

FIGS. 6A and 6B illustrate other physical devices D1 630, D2 640, that are along the physical path between the tunnel source and destination devices, in this example, routers R1 610 and R2 620. In FIG. 6A, the devices D1 and D2 provide a complete physical path between routers R1 and R2; in FIG. 6B, the devices D1 and D2 are coupled to each other via an (unknown) external network N 650, such as the Internet. Even though the configuration of FIG. 6B includes the unknown external network N 650, it is generally desirable to determine as much of the physical configuration as possible, because an analysis of the configuration may indicate changes that can be made to devices D1 and D2 to improve the network's performance. One of skill in the art will recognize that although only devices D1 and D2 are illustrated between the source and destination devices R1 and R2, these devices D1 and D2 may represent any number of devices along the physical path between R1 and R2.

A number of techniques are commonly available to determine connectivity among devices in a network. Such techniques include, for example, CDP (Cisco Discovery Protocol), LLDP (Link Layer Discovery Protocol), EDP (Extreme Discovery Protocol), FDP (Foundry Discovery Protocol), ADP (Alcatel Discovery Protocol), and others. Generally, the techniques used to infer a physical topology are dependent upon IP subnet data, MAC address forwarding table data, or neighbor discovery protocols. Neighbor discovery protocols are typically vendor specific and are only compatible with devices from that vendor. Advances on these technologies continue to be developed. For example, copending U.S. patent application Ser. No. 11/829,925, "LINK INFERENCE IN LARGE NETWORKS BASED ON INCOMPLETE DATA", filed 29 Jul. 2007 for Rajesh Balasubramaniam and James Mark Shaw, published as USPA 2008-0031156, teaches determining the physical topology of a network with less than complete connectivity information by partitioning a network into a hierarchy of partitions and determining the topology of each of these substantially smaller partitions, and is incorporated by reference herein. In like manner, copending U.S. patent application Ser. No. 11/844,765, "INFERRING CONNECTIVITY AMONG NETWORK SEGMENTS IN THE ABSENCE OF CONFIGURATION INFORMATION", filed 24 Aug. 2007 for Pradeep Singh and Venuprakash Barathan, published as USPA 2008-0049645, teaches determining connections among external networks based on inferences from configuration data related to unconnected network segments coupled to these external networks, and is incorporated by reference herein.

If the physical connectivity among all of the devices has been previously determined, this information can be used directly to identify the determined physical path between the source and tunnel physical interfaces. In a network of moderate or large size, however, the available information is not complete, and the determination of the physical paths between device interfaces is often incomplete.

In another aspect of this invention, having determined the end points of each tunnel, the determination of the corresponding physical path is facilitated by conducting a directed search for the physical path between the source and destination of each tunnel. That is, as noted above, conventional topology determination techniques attempt to 'discover' connecting physical paths, typically with minimal knowledge of which devices actually communicate with each other. By coupling the information provided by this invention to these techniques, a synergy is achieved, because after determining the source and destination device for a tunnel, it is known that a physical path must exist between these devices, and when one technique fails to find a next-link in the path, one or more other techniques can be applied to further the search for this known-to-exist path.

Absent knowing that a path exists between a given source and a given destination, it would be infeasible to attempt to discover every possible physical path between each device and every other device in the network, and particularly infeasible to attempt to use alternative techniques each time a given technique indicates that it cannot determine whether a given link exists, because such a link may not, in fact, exist.

In accordance with this aspect of the invention, if the physical path between the determined source and destination device interfaces is unknown, the physical path between these interfaces at the source and destination of each tunnel is traced from the source device toward the destination device until the path reaches the destination device, or until the path terminates at an interface to an external network. If the path ends at an external network, the path tracing process is repeated in the opposite direction, from the destination device toward the source device until the reverse path terminates at a corresponding interface to the external network.

A hierarchy of path determination techniques is preferably used, such that when a higher-level technique fails to find a next-hop along the path, a lower-level technique is applied, starting with the path as thus far determined by the higher-level technique. When a next-hop device along the path is determined using the lower-level technique, the process continues from this next-hop device, preferably starting again with the tracing techniques of the highest applicable level.

Figure 7:
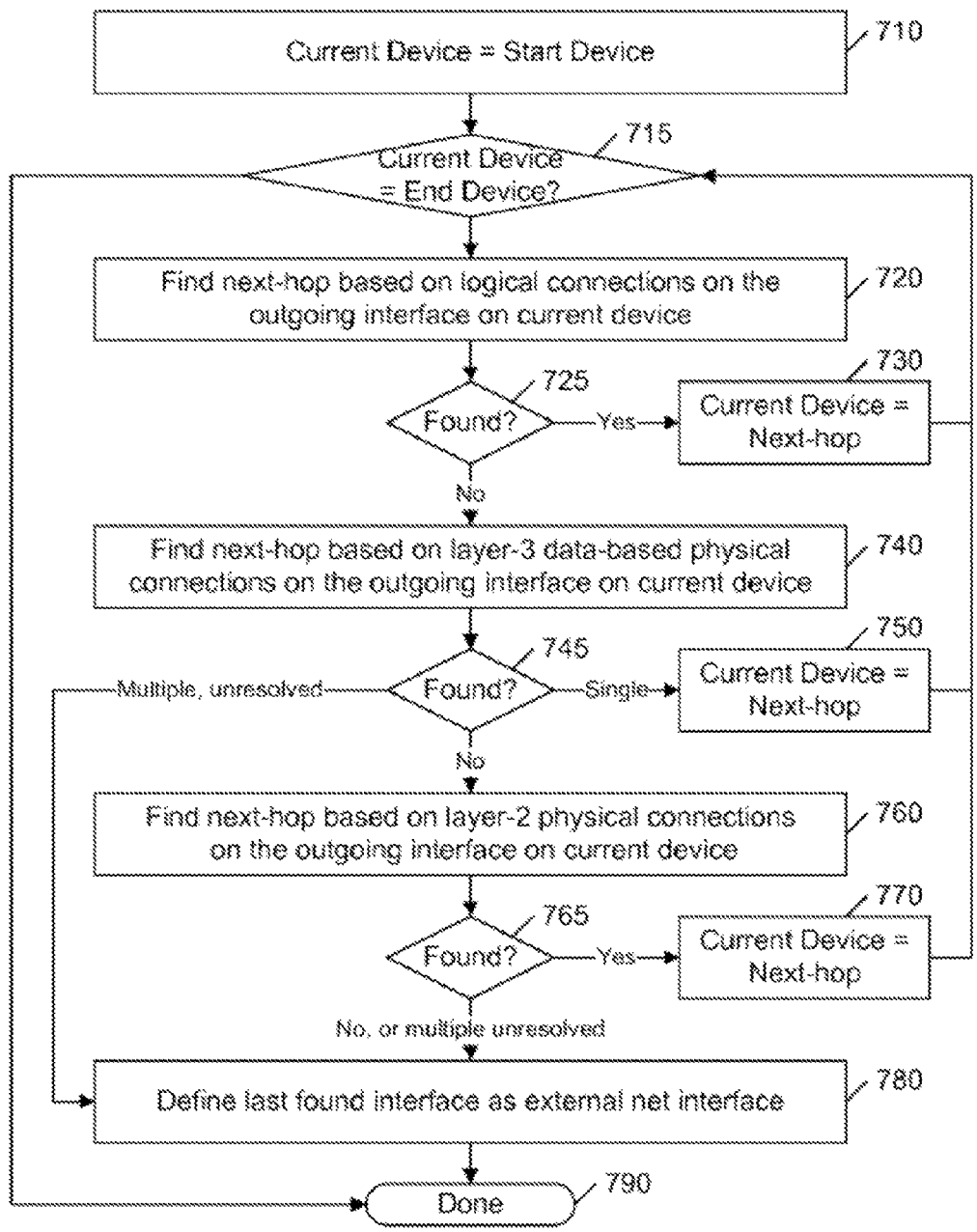
FIG. 7 illustrates an example flow-diagram for determining the physical topology of a tunnel based on logical and physical connections along a path between the source and destination interfaces of the tunnel in accordance with this invention.

FIG. 7 illustrates an example flow diagram for a hierarchical path determination technique for tracing a path from a given source toward a given destination. Initially, the device at one end of the tunnel is selected as the start of the path, with the device at the other end of the tunnel being the end of the path. At 710, the start device is set as the current device from which the search for a next device along the path, the 'next-hop' device, is based, until the end device is reached, at 715.

At 720, the system attempts to find the next-hop based on other logical connections, such as ATM or Frame Relay Virtual Circuits (VCs). The system checks for any non-tunnel logical connections that may be configured to carry the traffic along the path for this tunnel. In a network consisting of ATM (Asynchronous Transfer Mode) devices, the outgoing interface on the current device may be physically connected using an ATM cloud or a multipoint link.

In a preferred embodiment of this invention, the system searches the available configuration data for any virtual circuits that are configured on the outgoing interface of the current device to find the next hop. Although the logical next-hop may bypass intermediate physical hops, the use of the next logical hop effectively partitions the path into manageable sub-paths. Upon completion of the trace from the start device to the end device for the virtual circuit corresponding to the tunnel, this process can be repeated for each of these detected virtual circuits along the path to determine the physical topology of these sub-sections of the path.

If, at 725, a virtual circuit is found to be configured on the outgoing interface of the current device, the system identifies the destination of the virtual circuit as the next-hop, and sets this next-hop as the new current device, at 730, and, at 715, if this new current device is not the end device, the search for a logical next hop is repeated.

If, at 725, a virtual circuit is not found, the system attempts to find the next-hop device based on layer-3 data-based physical connections on the outgoing interface on the current device, at 740. Typically, the layer-3 data-based connection information is found in routing table or static route data, although operational data, such as the status of each interface, may also provide such connection information. For brevity, the term 'routing data' is used hereinafter to refer to any source of layer-3 data-based connection information.

At, 740, the routing data of the current device is assessed to determine the outgoing interface corresponding to the tunnel path. Having identified the outgoing interface, the routing data of each of the other devices on the network are assessed to determine which device routes data to this outgoing interface on the current device. Again assuming a communications symmetry, the device that routes data to this interface on the current device is assumed to be the device to which the current devices routes outgoing data; i.e. the next-hop device.

If, at 745, only one device is found to be coupled to this interface on the current device, this next-hop device is set as the new current device, at 750, and, if this new current device is not the end device of the tunnel, the process is repeated, at 715.

If multiple devices are found to be coupled to the outgoing interface on the current device, the system assesses these devices in an attempt to determine a single device corresponding to the next-hop along the tunnel path. Obviously, if one of the candidate devices is the end device, it is the next-hop; in like manner, if only one of the candidate devices is configured to route data to the end device, it is selected as the next-hop. Also, to reduce the set of candidate next-hops, non-end devices that do not further route the data, i.e. terminal devices, are eliminated from consideration as candidate next-hops.

If multiple candidate devices still exist after the above determinations, the process is either terminated with a not-found determination, or continued by assessing the paths through each of the multiple candidate devices to determine whether the end device is coupled to the candidate device.

If a single candidate next-hop device is found, at 745, this next-hop device is set as the new current device, at 750. If, at 715, the current device is not the end-device, the process is repeated, searching for a logical next-hop device, at 720, and, if unsuccessful, searching level-3 configurations for a physical next-hop device, at 740.

If, at 745, a next-hop is not found based on level-3 configuration data, the current device must be a switch, and the system attempts to determine the next-hop based on level-2 Virtual LAN (VLAN) configuration data associated with this switch.

Although VLAN IDs are used to isolate paths through the switch from each other, if the switch is a combined switch and router, such as Cisco's Route Switch Module, the routing module may perform inter-VLAN routing. In this case, the routing data of the routing module is examined to determine the output port on the routing module that leads to the end device. If such a port cannot be found, the process at block 760 is terminated with a not-found determination. If the port is found, it will indicate a (new) VLAN ID associated with the path to the end device. Using this new VLAN ID, the output port/interface of the switch that includes this VLAN ID is determined, from which the next-hop device is found by again assuming a communications symmetry, and searching for a device that sends data to this determined output interface on the current device.

If the current device is a conventional non-routing switch, the VLAN IDs that are associated with the input interface of the current device are identified and all of the other interfaces on the current device having a VLAN ID in common with the VLAN IDs on the input interface are identified. If an interface having a common VLAN ID with the input interface is not found, the process of block 760 is terminated with a not-found determination.

If the set of interfaces having a common VLAN ID with the input interface includes only one interface, this interface is identified as the output interface of the current device. As detailed above, the next-hop device is found by assuming a communications symmetry, and searching for a device that sends data to this determined output interface on the current device.

If the set of interfaces having a common VLAN ID with the input interface includes multiple interfaces, the system assesses each interface in an attempt to find a single viable interface that leads to the end-device. The system first eliminates interfaces that do not correspond to a physical connection, and then attempts to find an interface from the remaining set that leads to a device that is on a path to the end-device. In a preferred device, a breadth-first search is performed until such an interface (and corresponding next-hop device) is found, or until the search is deemed infeasible and a not-found determination is made.

If the searches of blocks 720, 740, and 760 fail to find a next-hop device before the end-device is reached, the last determined output interface is identified as an assumed interface to an external/unknown network, at 780.

If, at 790, such an interface to an external/unknown network is reported, instead of a complete start-device to end-device path, the system is configured to reverse the start and end devices and repeat the process, starting at 710. For example, having searched from the tunnel source R1 610 to the tunnel destination R2 620 in FIG. 6B, and ending at the external/unknown network N 650 after device D1 630, the search is repeated from the tunnel destination R2 620 back to the tunnel source R1 610 in an attempt to determine the physical path, via D2 640, on the other side of the network N 650.

In most cases, if the search from the tunnel source to the tunnel destination ends at an external network, the search from the tunnel destination to the tunnel source will also end at an external network, resulting in a topology such as illustrated in FIG. 6B. If, however, the search from the tunnel destination to the tunnel source provides a complete path to the tunnel source, this complete path is subsequently reported as the physical path corresponding to the tunnel, eliminating the need to include an external/unknown network in the determined physical topology. This destination-to-source path can also be assessed to ascertain that it provides a viable path from the tunnel source to the tunnel destination, and if not, this conflict of path determinations is reported to the user of the system.

Optionally, even if the tracing from the source device to the destination device ends at the destination device, the process may be repeated by tracing from the destination device to the source device. If the determined paths are not equivalent, a measure of ambiguity will be determined for each path, and the path with least ambiguity will be selected as the physical path corresponding to the tunnel. That is, for example, if at some point along a path, multiple output interfaces may be feasible, the selection of one of these output interfaces will have a higher degree of ambiguity than when a single output interface is found. In like manner, the use of level-3 connectivity data to determine a next-hop can be considered to be less ambiguous than the use of level-2 connectivity data to determine a next-hop.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:
    receiving, at a processing system, configuration data associated with devices in the network, the configuration data indicating how the devices have been configured;
    storing the configuration data in a non-transitory computer-readable medium for subsequent processing by the processing system;
    identifying, by the processing system, a virtual connection in the configuration data of a first endpoint from which data is communicated to a second endpoint;
    determining, by the processing system, a path of the virtual connection based on identifying a hop along the path based on a search of link layer information in the configuration data and identifying a next hop along the path based on the link layer information; and
    providing, by the processing system, a representation of the path of the virtual connection that indicates the hops in a computer-implemented model of the network for presentation on a display device.

2. The method of claim 1, wherein receiving the configuration data comprises receiving network data.

3. The method of claim 1, wherein identifying the virtual connection comprises identifying a private Internet Protocol address for a virtual private network.

4. The method of claim 1, wherein identifying the virtual connection comprises identifying an asynchronous transfer mode virtual circuit.

5. The method of claim 1, wherein identifying the virtual connection comprises identifying a multi-protocol label switching label switch path.

6. A method comprising:
    receiving, at a processing system, configuration data associated with devices in the network, the configuration data indicating how the devices have been configured;
    storing the configuration data in a non-transitory computer-readable medium for subsequent processing by the processing system;
    identifying, by the processing system, a virtual connection in the configuration data of a first endpoint from which data is communicated to a second endpoint;
    determining, by the processing system, a path of the virtual connection based on identifying a hop along the path based on a search of link layer information in the configuration data and identifying a next hop along the path based on a search of network layer information in the configuration data; and
    providing, by the processing system, a representation of the path of the virtual connection that indicates the hops in a computer-implemented model of the network for presentation on a display device.

7. The method of claim 6, wherein receiving the configuration data comprises receiving network data.

8. The method of claim 6, wherein identifying the virtual connection comprises identifying a private Internet Protocol address for a virtual private network.

9. The method of claim 6, wherein identifying the virtual connection comprises identifying an asynchronous transfer mode virtual circuit.

10. The method of claim 6, wherein identifying the virtual connection comprises identifying a multi-protocol label switching label switch path.

11. A method comprising:
    receiving, at a processing system, configuration data associated with devices in the network, the configuration data indicating how the devices have been configured;
    storing, by the processing system, the configuration data in a non-transitory computer-readable medium for subsequent processing by the processing system;
    identifying, by the processing system, a virtual connection in the configuration data of a first endpoint from which data is communicated to a second endpoint;
    determining, by the processing system, a path of the virtual connection based on identifying a hop along the path based on a search of link layer information in the configuration data and identifying a next hop along the path based on a search of virtual LAN data in the configuration data; and
    providing, by the processing system, a representation of the path of the virtual connection that indicates the hops in a computer-implemented model of the network for presentation on a display device.

12. The method of claim 11, wherein receiving the configuration data comprises receiving network data.

13. The method of claim 11, wherein identifying the virtual connection comprises identifying a private Internet Protocol address for a virtual private network.

14. The method of claim 11, wherein identifying the virtual connection comprises identifying an asynchronous transfer mode virtual circuit.

15. The method of claim 11, wherein identifying the virtual connection comprises identifying a multi-protocol label switching label switch path.

16. A system comprising:
    an input configured to receive configuration data associated with devices in the network, the configuration data indicating how the devices have been configured;
    a non-transitory computer-readable medium that stores the configuration data for subsequent processing; and
    a processor configured to:
        identify a virtual connection in the configuration data of a first endpoint through which data is communicated to a second endpoint,
        determine a path of the virtual connection based on a search of one or more layers of information that comprises a first search of link layer configuration data and a contingent second search of network layer configuration data based on the first search, and output a representation of the path of the virtual connection that indicates the hops in a computer-implemented model of the network for presentation on a display device.

17. The system of claim 16, wherein the input is configured to receive discovery protocol information.

18. The system of claim 16, wherein the processor is configured to determine the path based on a search of one or more layers of information that comprises a contingent third search of virtual LAN data based on the second search.

19. A method comprising:
receiving configuration data associated with devices in the network, the configuration data indicating how the devices have been configured;
storing the configuration data in a non-transitory computer-readable medium for subsequent processing;
identifying a tunnel in the configuration data of a first endpoint from which encapsulated data is communicated to a second endpoint in the network;
determining a physical path of the tunnel based on an assumed bi-directional symmetry for the tunnel between the first and second endpoints and a search of one or more layers comprising a first search of link layer data in the configuration data to identify a connection from a first hop to a second hop along the physical path; and a second search of network layer data in the configuration data when the first search fails to identify the connection from the first hop to the second hop; and
providing a representation of the path of the tunnel that indicates the hops in a computer-implemented model of the network for presentation on a display device.

20. The method of claim 19, wherein determining the physical path of the tunnel comprises determining respective interfaces used at endpoints of the tunnel.

\* \* \* \* \*